United States Patent [19]
Harvey

[11] Patent Number: 5,642,689
[45] Date of Patent: Jul. 1, 1997

[54] TUBULAR BIRD FEEDER WITH A SELF-CONTAINED SEED SCOOP

[76] Inventor: William H. Harvey, 10569 Foster, Overland Park, Kans. 66212

[21] Appl. No.: 511,682

[22] Filed: Aug. 7, 1995

[51] Int. Cl.⁶ .................................................. A01K 39/01
[52] U.S. Cl. .................................................. 119/57.8
[58] Field of Search .................. 119/57.8, 52.2, 119/57.9, 52.3

[56] References Cited

U.S. PATENT DOCUMENTS

| | | | |
|---|---|---|---|
| 32,387 | 3/1861 | Baird | D7/691 |
| D. 249,999 | 10/1978 | Burns | D8/16 |
| D. 337,244 | 7/1993 | Kilham | D7/691 |
| 2,683,440 | 7/1954 | Klix | 119/57.8 |
| 3,568,641 | 3/1971 | Kilham | 119/57.8 |
| 4,829,934 | 5/1989 | Blasbalg | 119/52 R |
| 4,977,859 | 12/1990 | Kilham | 119/52.2 |
| 4,996,947 | 3/1991 | Petrides | 119/57.8 |
| 5,062,388 | 11/1991 | Kilham | 119/52.2 |
| 5,063,877 | 11/1991 | Riggi | 119/52.2 |
| 5,123,380 | 6/1992 | Edwards | 119/57.8 |
| 5,235,935 | 8/1993 | Edwards | 119/57.8 |
| 5,372,094 | 12/1994 | Zens | 119/52.2 |
| 5,452,682 | 9/1995 | Bescherer et al. | 119/57.8 |

*Primary Examiner*—Robert P. Swiatek
*Attorney, Agent, or Firm*—Kenneth W. Iles

[57] ABSTRACT

A tubular bird feeder includes a self-contained seed scoop comprising a depending portion of a top cap, which includes a rim for seating about the exterior of the side wall of the tubular body. A bent wire hanger is inserted into a pair of opposed apertures near the top of the bird feeder and a channel in one side wall of the scoop portion and the cut-away portion of the scoop itself allow clearance of the hook portions of the hanger. A bottom cap closes the bottom of the tubular bird feeder. A number of apertures in the side wall of the tubular body of the bird feeder allow birds access to the seed and a number of dowels inserted through apertures lying across a diameter of a section of the tubular body of the bird feeder provide perches for the feeding birds.

8 Claims, 2 Drawing Sheets

TUBULAR BIRD FEEDER WITH A SELF-CONTAINED SEED SCOOP

BACKGROUND OF THE INVENTION

1. Field of the Invention

The present invention is related to an apparatus for feeding birds at a fixed feeding station that protects the bird food from the elements. More particularly, the present invention is related to a tubular bird feeder with a self-contained seed scoop that forms the top of the feeder.

2. Description of Related Art Including Information Disclosed Under 37 C.F.R. Sections 1.97–1.99

Tubular bird feeders, typically made from transparent plastic, have become very popular and bird feeding is the second most popular hobby in the country. The tubes typically have aligned holes across a diameter, through which perches comprising wooden dowels or plastic rods are inserted. Other holes above the perches allow the birds to eat seed from inside the feeder. The feeders have a cap on the top and a bottom to keep the seed inside.

A hanger, typically wire, is inserted through apertures toward the top of the hangers and the feeder is suspended from something, such as a tree. Alternatively, the feeder may be supported from below by a pole.

Typically the cap is removed to allow the feeder to be refilled. Filling the feeder often results in spilling a significant amount of bird seed onto the ground because the diameters of the feeders are typically about four inches (10 cm) or less. Commercially available scoops typically do not have a dispenser designed for such small diameter containers and may be difficult to find when needed, that is, they become lost or separated from the seed supply. Spilled seed attracts birds to the ground, where they may not be safe. Much spilled seed is not eaten, and therefore is substantially wasted. Finally, spilled seed often results in undesired or undesirable plants growing in the yard.

Scoops and bird feeders have been the subject of numerous patents, but none has been located that addresses the problems discussed above. Some examples of the prior art are given below.

U.S. Design Pat. No. 337,244, issued to Kilham on Jul. 13, 1993, discloses a "Bird Feeder Scoop" comprising a horn-shaped scoop having a handle comprising a substantially straight handle segment that bridges the concave curve of the scoop body.

U.S. Design Pat. No. 249,999, issued to Burns on Oct. 24, 1978, discloses a "Scoop" comprising a cylinder having ends cut off at a non-perpendicular angle and having a straight rod portion secured over an opening in the top to provide a handle.

U.S. Design Pat. No. 32,387, issued to Baird on Mar. 27, 1900, discloses a "Scoop" comprising a roughly semi-circular portion of a cylinder having a smoothly tapered end.

U.S. Pat. No. 4,829,934, issued to Blasbalg on May 16, 1989, discloses a "Bird Feeder" comprising a tubular bird feeder with a circular dish and base member which slips onto the bottom end of the tubular body.

U.S. Pat. No. 5,063,877, issued to Riggi on Nov. 12, 1991, discloses a "Bird Feeder Apparatus" comprising a conical top that covers a cylindrical feeder housing. A square base includes a plurality of perches that are inserted into holes around the base of the feeder, thereby securing the base to the feeder housing.

U.S. Pat. No. 5,372,094, issued to Zens on Dec. 13, 1994, discloses a "Bird Feeder" comprising a carton, like a half gallon paperboard milk carton, having a pair of holes at the top to suspending the feeder by strings, and a hole at the bottom for allowing bird seed to fall onto a perch and feed holder, or "a prefabricated perch and feed trough assembly." The carton is refilled by opening unfolding the top, refilling the carton with seed or other bird feed, and folding the top closed again.

None of these structures addresses the problem of having a bird feed scoop handy when needed or the problem of spilling the bird seed when filling a bird feeder.

Therefore, a need exists for a bird feeder that makes a bird feed scoop readily available and that reduces or eliminates the likelihood of spilling the bird feed when refilling the feeder.

SUMMARY OF THE INVENTION

Accordingly, it is a primary object of the present invention to provide a tubular bird feeder with a self-contained seed scoop that assures the user that a bird feed scoop will be readily available when needed.

It is a further object of the present invention to provide a tubular bird feeder with a self-contained seed scoop that reduces or eliminates the likelihood of spilling the bird feed when filling the bird feeder.

These and other objects of the present invention are achieved by providing a tubular bird feeder with a self-contained seed scoop in which the top closure or top cover includes a self-contained scoop that fits inside the bird feeder when the top cover is inserted into the bird feeder to protect the bird food. In the preferred embodiment, the body of the bird feeder is tubular, but the same principal of providing a self-contained bird feed scoop could be applied to a self-contained bird feeder of any cross sectional shape, for example, rectangular.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

DETAILED DESCRIPTION OF THE PREFERRED EMBODIMENTS

As required by the Patent Statutes and the case law, the preferred embodiment of the present invention and the best mode currently known to the inventor for carrying out the invention are disclosed in detail herein. The embodiment disclosed herein, however, is merely illustrative of the invention, which may be embodied in various forms. Therefore, specific structural and functional details disclosed herein are not to be interpreted as limiting, but merely to provide the proper basis for the claims and as a representative basis for teaching one skilled in the art to which the invention pertains to make and use the apparatus disclosed herein as embodied in any appropriately specific and detailed structure.

Figure 1:
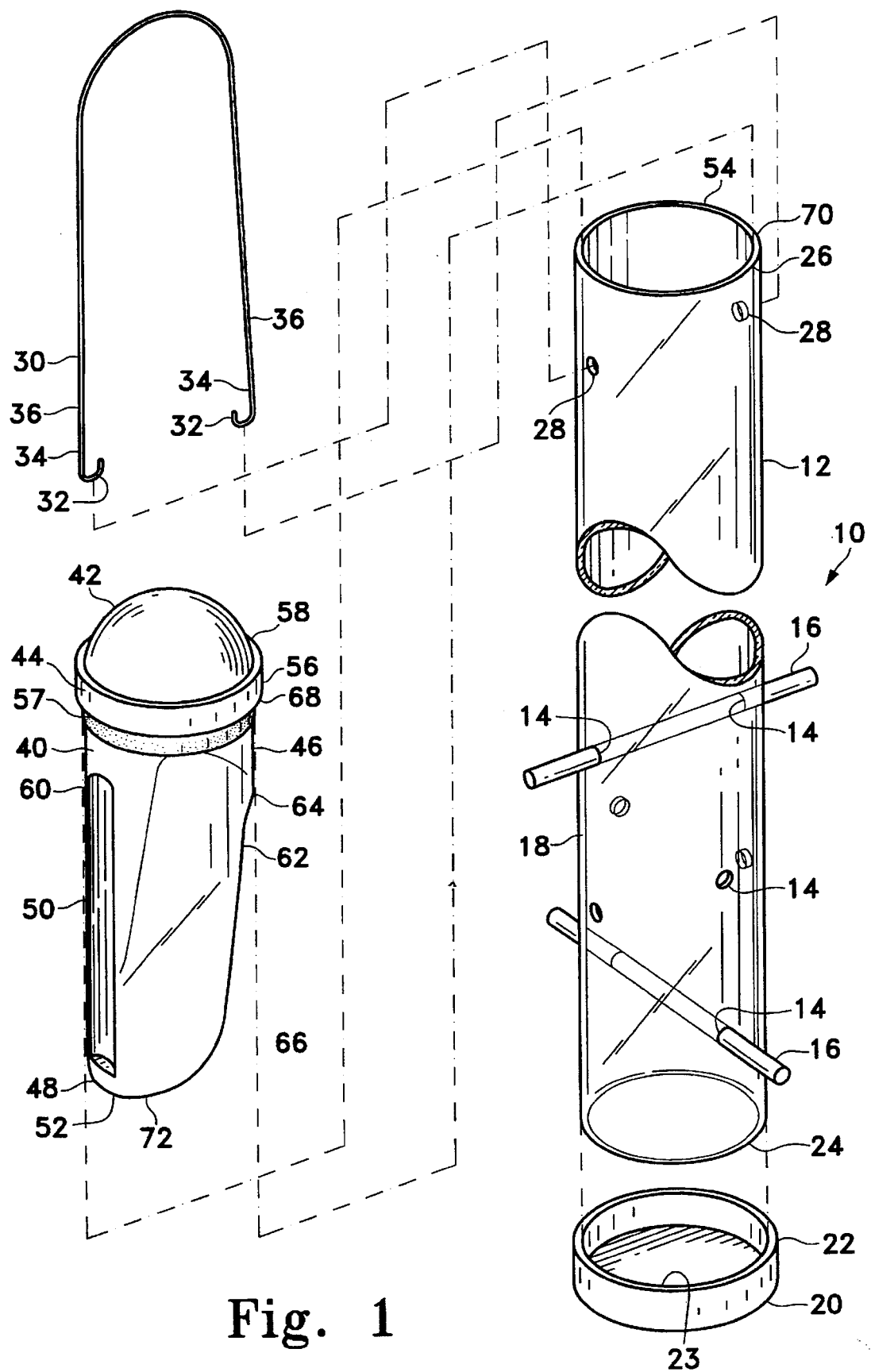
FIG. 1 is perspective exploded view of a tubular bird feeder with a self-contained seed scoop according to the present invention.
Figure 2:
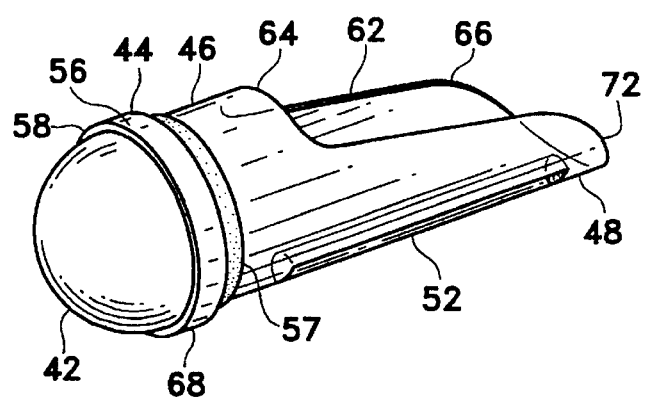
FIG. 2 is a left-hand perspective view of the top or scoop party of the tubular bird feeder with a self-contained seed scoop of FIG. 1.
Figure 3:
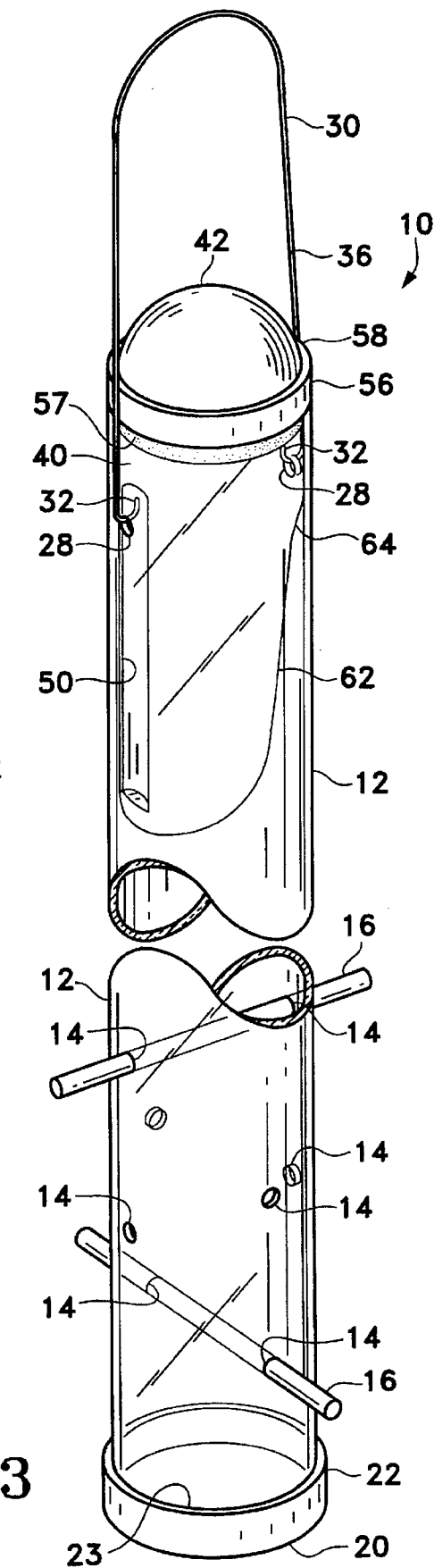
FIG. 3 is a perspective view of the tubular bird feeder with a self-contained seed scoop according to FIG. 1.

Referring now to FIGS. 1, 2, and 3, there is shown a tubular bird feeder with a self-contained seed scoop 10 according to the present invention having a tubular body 12, which may advantageously be made of transparent plastic having a diameter in a range of about 3–5 inches (7.62–12.7 cm) and a length in a range of about 8–15 inches (20–38 cm). A plurality of circular apertures 14 are distributed about the tubular body 12. A plurality of perches 16 are inserted into some selected two apertures 14 that lie across a diameter of the tubular body 12. The perches 16 are wooden dowels. When thus inserted, the perches 16 are held in place by frictional engagement with the side wall 18 of the tubular body 12.

A bottom end cap 20 includes a circumferential upstanding rim 22 that fits closely about a bottom circumference 24 of the tubular body 12 with the circumferential upstanding rim 22 fitting on the outside of the tubular body 12 and being held in position by frictional engagement sufficient to seal the bottom of the tubular bird feeder with a self-contained seed scoop 10 when it is filled with bird feed. Alternatively, the upstanding circumferential upstanding rim 22 of the circular bottom end cap 20, which has a circular bottom 23, can be made to fit inside the tubular body 12 and be retained therein by frictional engagement or a suitable adhesive.

An upper portion 26 of the tubular body 12 includes a pair of hanger-receiving apertures 28, which lie across a diameter of a cross section of the tubular body 12, for accepting a wire hanger 30, which is substantially U-Shaped and further includes one hook 32 on each end of the wire hanger 30. Each hook 32 consists of an upturned end portion 34 of a leg 36 of the wire hanger 30. Each hook 32 detachably engages one hanger-receiving aperture 28, thereby providing the tubular bird feeder with a self-contained seed scoop 10 with a convenient means for suspending it from a tree branch or the like.

A top cap 40 includes a top surface or dome top 42 having a depending circular cross section skirt 44, and a further depending scoop portion 46. The scoop portion 46 is incudes a tubular scoop body 48 having a cut-away or indented portion consisting of a V-shaped channel 50 formed along a portion of a long side wall 52 of the scoop portion 46. One hook 32 is received by the V-shaped channel 50 when the wire hanger 30 is installed into the hanger-receiving apertures 28. The distance from a top edge 54 of the tubular body 12 to either hanger-receiving aperture 28 is the same as the distance from a top edge 58 of a rim 56 of the top cap 40 to an upper end 60 of the V-shaped channel 50.

The depending scoop portion 46 includes cut-away portion 62 that becomes progressively wider from an upper scoop end 64 to a lower scoop end 66, where the cut-away portion 62 is approximately a diameter of the tubular scoop body 48 in width. The distance from the upper scoop end 64 to the rim 58 of the top cap 40 is at least as great as the distance from the top edge 54 of the tubular body 12 to either hanger-receiving aperture 28. This feature, combined with the similar spacing of the V-shaped channel 50 described above, allows the top cap 40 to fit snugly within the tubular body 12 without interference from the hooks 32 of the wire hanger 30 by providing clearance for the hooks 32 on both the scoop portion 46 and the V-shaped channel of the tubular scoop body 48.

The rim 56 includes a depending cylindrical flange portion 68, having a larger diameter than the tubular scoop body 48 (which fits inside the tubular body 12), that fits over an outside surface 70 of the tubular body 12, which seats on the inner surface of the rim 56. A high-friction band 57 lies about the tubular scoop body 48 adjacent to the dome top 42 of the top cap 40 for increasing the tightness of fit and degree of frictional engagement between the top cap 40 and the tubular body 12 of the bird feeder 10. These two features prevent rainwater from entering the top of tubular bird feeder with self-contained seed scoop 10, which could ruin the bird seed.

In use, the user optionally removes the bird feeder 10 from is hanging position, removes the top cap 40, fills the scoop portion 48 with bird seed or other bird feed by scooping it from a larger storage container. The lower edge 72 of the scoop portion 48 is inserted into the top of the tubular body 12 and the contents are poured into the tubular body 12. More than one scoopful may be required to fill the bird feeder 10. When a sufficient amount of bird feed has been poured into the bird feeder 10, the top cap 40 is replaced inside the tubular body 12 and pushed downward until the inside surface of the top edge 54 of the rim 56 is seated on the top edge 54 of the tubular body 12. Then the tubular bird feeder with self-contained seed scoop is replaced in the user desired location by hooking the wire hanger 30 over a support member.

While the present invention has been described in accordance with the preferred embodiments thereof, the description is for illustration only and should not be construed as limiting the scope of the invention. Various changes and modifications may be made by those skilled in the art without departing from the spirit and scope of the invention. For example, a top cover having a self-contained scoop can be built into any shape of bird feeder, such as a small house-shaped bird feeder. Therefore, the invention should be limited only as defined by the following claims.

I claim:

1. A bird feeder comprising:

a. a tubular body having a bottom end cap fastened thereto at a bottom end of said tubular body;

b. a top cap comprising a scoop removably inserted into an upper end of said tubular body wherein said scoop of said top cap further comprises a depending scoop portion having a smaller diameter than said tubular body of said bird feeder; and c. a pair of hook-receiving apertures aligned across a diameter of tubular body adjacent to said upper end of tubular body and a hanger comprising a U-shaped hanging portion terminating in two depending leg portions with each said leg portion ending in a hook, and one said hook inserted into each said hook-receiving aperture and wherein said depending scoop portion further comprises a long side wall including a V-shaped channel along a portion of said long side wall for providing clearance for one said book of said hanger.

2. A bird feeder comprising:

a. a tubular body having a bottom end cap fastened thereto at a bottom end of said tubular body;

b. a top cap comprising a scoop removably inserted into an upper end of said tubular body wherein said scoop of said top cap further comprises a depending scoop portion having a smaller diameter than said tubular body of said bird feeder, wherein said scoop further comprises a cut-away portion of said tubular scoop body, said cut-away portion tapering from a narrow opening at an upper scoop end to a wider opening at a lower scoop end.

3. A bird feeder comprising:

a. a tubular body having a pair of hanger-receiving apertures aligned across a diameter of said tubular body adjacent to an upper end of said tubular body and a hanger comprising a U-shaped hanging portion terminating in two depending leg portions with each leg portion ending in a hook, and one said hook inserted into each hanger-receiving aperture and a bottom end cap fastened thereto;

b. a top cap Comprising a depending cylindrical flange portion seated about an outside surface of said upper end of said tubular body, with said top cap removably inserted into said upper end of said tubular body and said top cap further comprising a depending scoop portion comprising a smaller diameter than said tubular body of said bird feeder, and a long side wall including a V-shaped channel along a portion of said long side wall for providing clearance for one said hook of said hanger.

4. A bird feeder in accordance with claim 3 wherein said scoop comprises a cut-away portion of said tubular scoop body, said cut-away portion tapering from a narrow opening at an upper scoop end to a wider opening at a lower scoop end, said cut-away portion providing clearance for one said hook of said hanger.

5. A bird feeder in accordance with claim 3 wherein said tubular body further comprises a plurality of apertures therethrough and said apertures further comprise a plurality of apertures arranged in pairs with two said apertures of said pair aligned across a diameter of said tubular body.

6. A bird feeder in accordance with claim 5 comprising at least one perch inserted through of at least one said pair of aligned apertures.

7. A bird feeder in accordance with claim 3 further comprising a band of high-friction surface about said tubular scoop body adjacent to a top portion of said top cap.

8. A bird feeder in accordance with claim 3 wherein said top cap further comprises a dome top.

* * * * *